United States Patent [19]

Schlatter

[11] 3,800,046

[45] Mar. 26, 1974

[54] ARTIFICIALLY SWEETENED CONSUMABLE PRODUCTS

[75] Inventor: James M. Schlatter, Glenview, Ill.

[73] Assignee: G. D. Searle & Co., Chicago, Ill.

[22] Filed: Feb. 9, 1972

[21] Appl. No.: 224,989

Related U.S. Application Data

[63] Continuation-in-part of Ser. No. 841,582, July 14, 1969, Pat. No. 3,714,139, and a continuation-in-part of Ser. No. 2,393, Jan. 12, 1970, Pat. No. 3,642,491, said Ser. No. 841,592, is a continuation-in-part of Ser. No. 543,054, Pat. No. 3,492,131.

[30] Foreign Application Priority Data

July 6, 1970 Italy .................................. 51947/70
Apr. 17, 1967 Great Britain ..................... 17474/67
July 17, 1968 Great Britain ..................... 33971/68

[52] U.S. Cl. ................ 426/168, 426/190, 426/205, 426/212, 426/217

[51] Int. Cl. ............................................. A23l 1/26

[58] Field of Search ............. 99/141 A, 28, 100, 78, 99/130

[56] References Cited

UNITED STATES PATENTS

| 3,475,403 | 10/1969 | Mazeer et al. ................. 99/141 A X |
| 3,492,131 | 1/1970 | Schlatter .......................... 99/141 A |
| 3,695,898 | 10/1972 | Hill et al. .......................... 99/141 A |
| 3,714,139 | 1/1973 | Schlatter ...................... 99/141 A X |
| 3,642,491 | 2/1972 | Schlatter ...................... 99/141 AX |

*Primary Examiner*—Joseph M. Golian
*Attorney, Agent, or Firm*—John A. Dhuey

[57] ABSTRACT

Artificially sweetened consumable products and sweetening compositions having low caloric content and lacking in unpleasant after-taste are obtained by incorporating a sweetening agent of the class consisting of the lower alkyl esters of aspartylhexahydrophenyl=alanine.

10 Claims, No Drawings

ARTIFICIALLY SWEETENED CONSUMABLE PRODUCTS

This application is a continuation-in-part of my co-pending applications Ser. Nos. 841,582, now U.S. Pat. No. 3,714,139 and 2,393, now U.S. Pat. No. 3,642,491 filed July 14, 1969 and Jan. 12, 1970, respectively. Application Ser. No. 841,592 is a continuation-in-part of application Ser. No. 543,054, now U.S. Pat. No. 3,492,131, filed Apr. 18, 1966.

The present invention relates to artificially sweetened consumable products and sweetening compositions which contain as the sweetening agent a lower alkyl ester of aspartylhexahydrophenylalanine as represented by the following structural formula

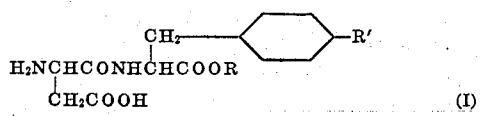

wherein R is a lower alkyl radical, R' is a hydrogen atom or a hydroxy or lower alkoxy radical and the stereo = chemical configuration is DL-DL, L-L, DL-L or L-DL.

The lower alkyl radicals encompassed by that formula are typified by methyl, ethyl, propyl, butyl, pentyl, hexyl, heptyl and the branched-chain isomers thereof. The lower alkoxy radicals contain up to 7 carbon atoms and are illustrated by methoxy, ethoxy, propoxy and isopropoxy.

The use of low caloric non-nutritive sweentening agents to replace sucrose is of great importance to diabetic and diet-conscious individuals. This need has stimulated the search for artificial sweentening agents which may be used as sugar substitutes. The first artificial sweetener approved for general use was saccharin. This substance is remarkably sweeter than sucrose, having a potency of 250–350 times the latter material, but it suffers from the serious disadvantage of possessing a bitter after-taste. More recently, the sweetening property of cyclohexylsulfamic acid (cyclamate) and its sodium and calcium salts was discovered. Those substances are about 30 times as sweet as sucrose, but likewise suffer from serious disadvantages.

The dipeptide derivatives employed in the present invention are uniquely characterized by the completely unexpected property of possessing a sweet taste. Thus, by virtue of possessing this property these compounds can be usefully employed to impart sweetness to edible materials. The term "edible materials" as used here and throughout the specification signifies all non-toxic substances consumable by humans or other animals in solid or liquid form. Illustrative of such substances are: foods, including foodstuffs; prepared food items; chewing gum and beverages; food additives, including flavoring and coloring agents as well as flavor enhancers; and pharmaceutical preparations.

The compounds of formula (I) provide advantages as sweetening agents in view of their physical form and stability. Thus, for example a representative species of formula (I), i.e. L-α-aspartyl-L-hexahydrophenylalanine methyl ester, has been found to be a crystalline material which does not possess hygroscopic properties. In view of their crystalline form, water solubility and stability, the compounds of formula (I) can be prepared in a variety of forms suitable for the utilization of sweetening agents. Typical forms which can be employed are: solid forms such as powders, tablets, granules, and dragees; and liquid forms such as solutions, suspensions, syrups, emulsions as well as other commonly employed forms particularly suited for combination with edible materials. These forms can consist of the compounds of formula (I) apart or in association with non-toxic sweetening agent carriers, i.e. non-toxic substances commonly employed in association with sweetening agents. Such suitable carriers include liquids such as water, ethanol, sorbitol, glycerol, citric acid, corn oil, peanut oil, soybean oil, sesame oil, propylene glycol, corn syrup, maple syrup and liquid paraffin, and solids such as lactose, cellulose, starch, dextrin and other modified starches, calcium phosphate and di- and tri-calcium sulfate. Obviously incompatible for use with the sweetening agents of formula (I) would be toxic carriers such as methanol and dimethyl sulfoxide.

Likewise useful and compatible are those novel compositions containing a dipeptide of formula (I) combined with a known sweetening agent such as saccharin or cyclamate, which combinations, as a result of the observed synergistic effect, possess enhanced sweetening potency.

Below are examples of specific edible materials which can be sweetened by the addition of a compound of formula (I), or by a novel combination of the dipeptide sweetening composition of formula (I) with a known sweetening agent such as sucrose, saccharin and cyclamate, apart or in combination with a non-toxic sweetening agent. Such examples include: fruits, vegetables, juices; meat products such as ham, bacon and sausage; egg products; fruit concentrates; gelatins and gelatin-like products such as jams, jelly, preserves etc.; milk products such as ice cream, sour cream and sherbet; icings; syrups including molasses; corn, wheat, rye, soybean, oat and rice products such as bread, cereals, pasta and cake mixes; fish; cheese and cheese products; nut meats and nut products; beverages such as coffee, tea, non-carbonated and carbonated soft drinks, beers, wines and other liquors; and confections such as candy and fruit flavored drops; and condiments such as herbs, spices and seasonings; flavor enhancers such as monosodium glutamate; and chewing gum. Additional illustration of the type of commercial products in which the sweetening agent or combinations thereof with known sweetening agents can be used are prepared packaged products, such as dietetic sugar, liquid sweeteners, granulated flavor mixes which upon reconstitution with water provides non-carbonated drinks, instant pudding mixes, instant coffee and tea, coffee whiteners, malted milk mixes, pet foods, livestock feed, tobacco, and consumable toiletries such as mouth washes and toothpaste as well as proprietary and non-proprietary pharmaceutical preparations and other products of the food, pharmaceutical and sundries industries. Illustrations of the preparation of such sweetened products are given below.

COFFEE

To rehydrated hot brewed coffee was added a sample of L-α-aspartyl-L-hexahydrophenylalanine methyl ester until the content of the dipeptide in the solution reached 0.033%. Upon comparison with similarly compared solutions of coffee sweetened with sucrose it was found that to achieve the sustained degree of sweetness a 4% solution of sucrose was required. Thus, in black coffee the dipeptide of formula (I) exhibited a sweetness potency of 150 times that of sucrose.

POWDERED BEVERAGE CONCENTRATE

The powder was prepared by mixing 0.05 part of citric acid, 0.04 part of imitation strawberry flavoring, 0.090 part of L-α-aspartyl-L-hexahydrophenyl = alanine methyl ester, and 0.609 part of lactose. The powder was then dissolved in 100 parts of spring water, and the resulting beverage was evaluated at room temperature. The sample was compared with a similar sample, prepared as indicated above except that 9 parts sucrose and 0.87 part dextrose were substituted for the dipeptide ingredient. Upon tasting it was determined that the two samples achieved the same degree of sweetness and hence it was concluded that in powdered concentrates of this type, the compound of formula (I) exhibited 125 times the sweetness potency of sucrose.

CARBONATED ORANGE SODA

A stock supply of bottler's syrup is prepared by mixing 5.5 ml. of a 50% aqueous citric acid solution with 150 ml. of water, dissolving 2 g. of L-α-aspartyl-L-hexahydrotyrosine methyl ester in that solution, adding successively 7.02 ml. of orange flavor base and 2.7 g. of sodium benzoate and diluting that mixture to 200 ml. with water. 1 oz. Samples of that bottler's syrup are transferred to 6 oz. bottles and 100 ml. of cold tap water is added to each bottle. To each bottle 42 ml. of cold charged bottling water (5 volumes carbon dioxide) is then added to achieve carbonation. Each bottle is capped and the contents mixed. Comparison of the latter samples with orange soda containing the quantity of sucrose 50 times that of the named dipeptide derivatives reveal no detectable difference in sweetness.

SWEETENING SOLUTION FORMULATION

Warm 1.0 gallon of distilled or de-ionized water to 160°–180° F. and add 0.35 oz. of benzoic acid and 0.175 oz. of methyl p-hydroxybenzoate. After these preservatives are dissolved, add 1.0 gallon more of distilled or de-ionized water. Bring the solution to room temperature. Then add 0.3 lb. of L-α-aspartyl-L-hexahydrophenylalanine methyl ester. Add distilled or de-ionized water to bring the volume to 2.5 gallons. Each teaspoon of the sweetening solution is equivalent to about 1.6 teaspoons of sugar.

MILK PUDDING

Add 1.14 ozs. of the following formula to two cups of cold skimmed milk in a bowl. Stir slowly with an egg beater to disperse the powder, then mix rapidly until a smooth texture is obtained. Allow to set.

Alginate — 6 lbs.
Cocoa — 30 lbs.
Tetrasodium pyrophosphate, anhydrous — 3 lbs.
Salt — 1 lb., 8 ozs.
L-Aspartyl-L-hexahydrophenylalanine methyl ester — 1 lb., 2 ozs.
Vanillin — 4.8 ozs.

PRESERVES (100 LB. BATCH)

Fruit — 55 lbs.
L-Aspartyl-L-hexahydrophenylalanine methyl ester — 1½ ozs.
Pectin (low methoxyl) — 1 lb.
Potassium sorbate — 1 oz.
Water — 5 gal., 1 pint

DIETETIC SYRUP

L-Aspartyl-L-hexahydrophenylalanine methyl ester — 0.30%
Carboxymethylcellulose — 0.50%
Pectin — 1.60%
Flavor — 8.50%
Citric acid, anhydrous — 2.00%
Color — 0.30%
Sodium benzoate — 0.10%
Water — 86.70%

DRY GELATIN MIX

A sample is prepared from 2.07 g. of plain gelatin, 0.34 g. of imitation raspberry flavoring, 0.34 g. of citric acid, 14.41 g. of lactose and 0.10 g. of L-aspartyl-L-hexahydrophenylalanine methyl ester. Those materials are dry blended and packaged to form a dry gelatin mix package. At the time the gelatin dessert is prepared, the dry content of the package is combined with about 83 ml. of boiling spring water. Thereafter the solution is poured into dishes and chilled to set.

It has been determined that the sweetening property of the dipeptide substances used in this invention is dependent upon the stereochemistry of the individual amino acids, e.g. aspartic acid, phenylalanine, tyrosine and tyrosine O-alkyl esters from which the peptides are derived. Each of the amino acids, can exist in either the D or L form, but it has been determined that the L—L isomers, e.g. L-α-aspartyl-L-hexahydrophenylalanine ester derivatives, are especially sweet while the corresponding D—D, D-L, and L-D isomers are not. Moreover, mixtures containing the L-L isomers, i.e. DL—DL, L-DL or DL-L share that property of sweetness also.

The sweetening compositions of the present invention are particularly useful to diabetics as substitutes for sugar. They are additionally lacking in the unpleasant aftertaste exhibited by such synthetic sweeteners such as saccharin and cyclamate.

The compounds of formula (I) are conveniently produced by reducing the corresponding unsaturated compounds of the formula

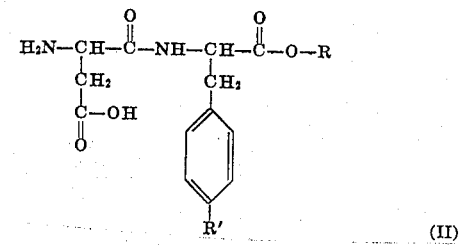

(II)

wherein R and R' have the same meanings indicated above, with hydrogen and a suitable hydrogenation catalyst, for example 5% rhodium-on-carbon, under mild conditions such as room temperature and a pressure of 2–4 atmospheres. This process is specifically illustrated by the following example:

To a solution of 7.9 parts of L-α-aspartyl-L-phenylalanine methyl ester in 250 parts of 0.1 M acetic acid is added 3 parts of 5% rhodium-on-carbon catalyst and the mixture is hydrogenated at room temperature and at 3 atmospheres pressure. The reaction is allowed to proceed until 3 molecular equivalents of hydrogen are absorbed. The catalyst is removed by filtration and the filtrate is concentrated under reduced pressure in a water bath at 40° C. The resulting oil is twice dissolved in anhydrous ethanol and the ethanol is removed by distillation. The residual oil is stirred with diethyl ether to give a solid material, which is dried in vacuo to afford, as a crystalline material, L-α-aspartyl-L-hexahydrophenylalanine methyl ester, melting with effervescence at about 130°–137° C. The compound is further characterized by an optical rotation in aqueous solution of about −13.5°.

The substitution of 4 parts of L-α-aspartyl-L-tyrosine methyl ester for the phenylalanine derivative employed above affords, upon hydrogenation in the identical manner L-α-aspartyl-L-hexahydrotyrosine methyl ester, melting with effervescence at about 101°–135° C. and further characterized by an optical rotation in aqueous solution of −12.5°.

In a similar manner substitution of the appropriate starting material of formula (II) for the L-α-aspartyl-L-phenylalanine methyl ester employed in the procedure detailed above affords upon hydrogenation the following product of formula (I):

L-α-aspartyl-L-hexahydrophenylalanine ethyl ester,

L-α-aspartyl-L-hexahydro-O-methyltyrosine methyl ester,

L-α-aspartyl-L-hexahydrophenylalanine propyl ester,

L-α-aspartyl-L-hexahydro-O-butyltyrosine ethyl ester.

It is understood that the scope of the invention is not to be limited by the various embodiments of the invention described above. Various modifications in materials and methods will be apparent to those skilled in the art without departing from the scope of the invention as claimed in the following claims.

I claim:

1. A sweetened consumable material comprising the edible material and a sweetening agent represented by the following formula

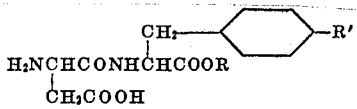

wherein R is a lower alkyl radical, R' is selected from the group consisting of a hydrogen atom and hydroxy and lower alkoxy radicals and the stereochemical configuration is L-L, DL-DL, L-DL or DL-L, in the amount which will afford the degree of sweetness desired.

2. As in claim 1, a sweetened edible material comprising the edible material and L-α-aspartyl-L-hexahydrophenylalanine methyl ester in the amount which will afford the degree of sweetness desired.

3. As in claim 1, a sweetened dietetic beverage comprising the beverage and a sweetening agent represented by the following formula

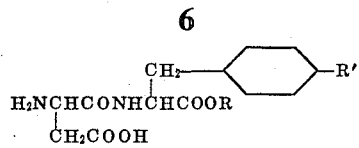

wherein R is a lower alkyl radical, R' is selected from the group consisting of a hydrogen atom and hydroxy and lower alkoxy radicals and the stereochemical configuration is L—L, DL—DL, L-DL or DL-L, in the amount which will afford the degree of sweetness desired.

4. As in claim 1, a sweetened dietetic beverage comprising the beverage and L-α-aspartyl-L-hexahydrophenyl =alanine methyl ester in the amount which will afford the degree of sweetness desired.

5. As in claim 1, a sweetened fresh fruit pack comprising the fresh fruit pack and a sweetening agent represented by the following formula

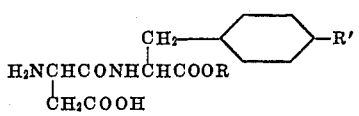

wherein R is a lower alkyl radical, R' is selected from the group consisting of a hydrogen atom and hydroxy and lower alkoxy radicals and the stereochemical configuration is L—L, DL—DL, L-DL or DL-L, in the amount which will afford the degree of sweetness desired.

6. As in claim 1, a sweetened fresh fruit pack comprising the fresh fruit pack and L-α-aspartyl-L-hexahydrophenylalanine methyl ester in the amount which will afford the degree of sweetness desired.

7. As in claim 1, a sweetened gelatin dessert comprising the gelatin dessert and a sweetening agent represented by the following formula

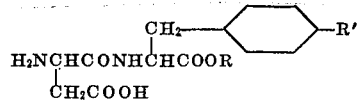

wherein R is a lower alkyl radical, R' is selected from the group consisting of a hydrogen atom and hydroxy and lower alkoxy radicals and the stereochemical configuration is L—L, DL—DL, L-DL or DL-L, in the amount which will afford the degree of sweetness desired.

8. As in claim 1, a sweetened gelatin dessert comprising the gelatin dessert and L-α-aspartyl-L-hexahydro =phenylalanine methyl ester in the amount which will afford the degree of sweetness desired.

9. As in claim 1, a sweetened powdered beverage concentrate comprising the powdered beverage concentrate and a sweetening agent represented by the following formula

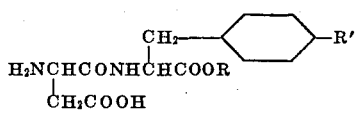

wherein R is a lower alkyl radical, R' is selected from the group consisting of a hydrogen atom and hydroxy and lower alkoxy radicals and the stereochemical configuration is L—L, DL—DL, L-DL or DL-L, in the amount which will afford the degree of sweetness desired.

10. As in claim 1, a sweetened powdered beverage concentrate comprising the powdered beverage concentrate and L-α-aspartyl-L-hexahydrophenylalanine methyl ester in the amount which will afford the degree of sweetness desired.

* * * * *